May 6, 1952

J. L. BROOKS 2,595,329

VEHICLE SEAT GUARD

Filed March 26, 1949

Inventor
JAMES L. BROOKS
By Weatherford + Weatherford
Attorneys

May 6, 1952    J. L. BROOKS    2,595,329
VEHICLE SEAT GUARD
Filed March 26, 1949    2 SHEETS—SHEET 2
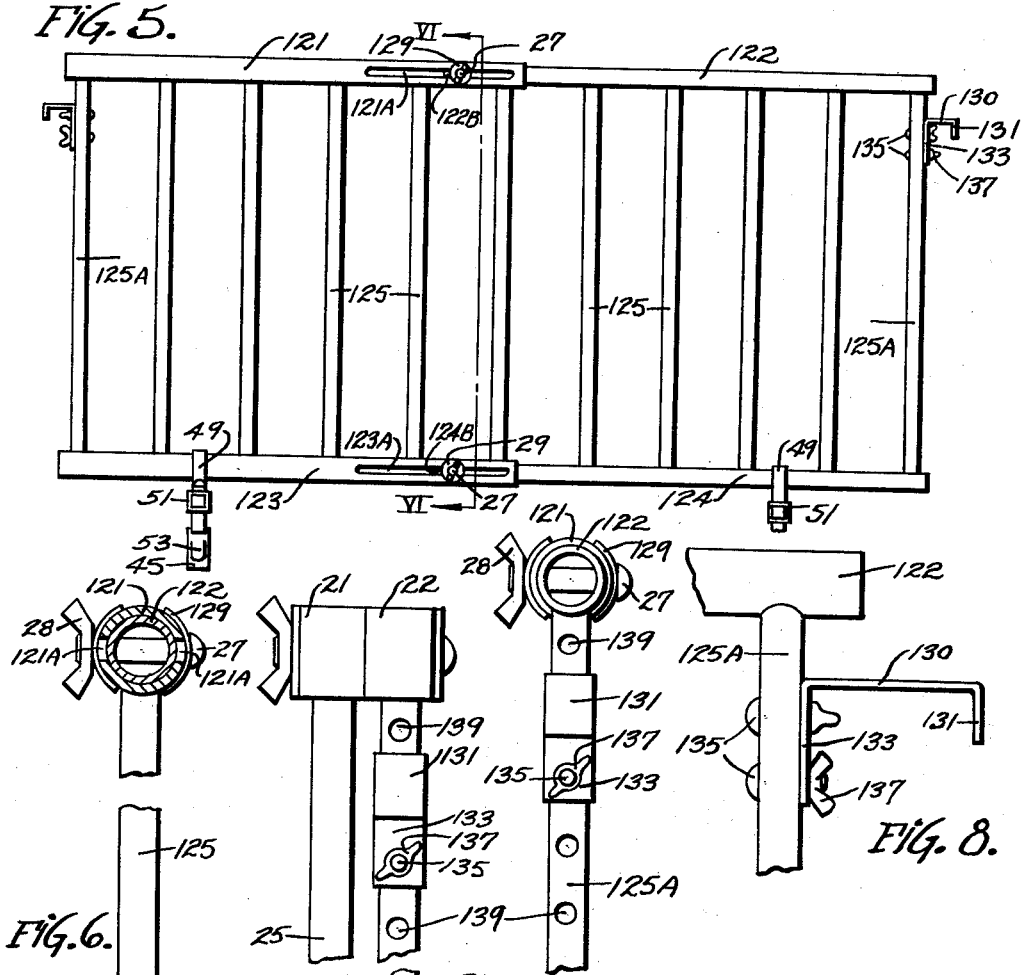
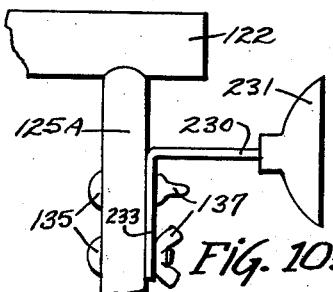
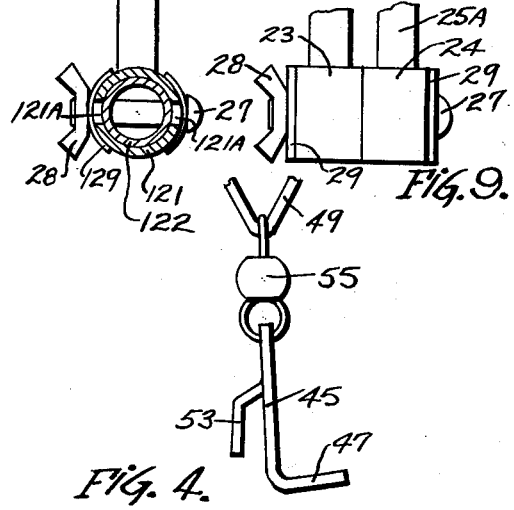
Inventor
JAMES L. BROOKS
By Weatherford & Weatherford
Attorneys Patented May 6, 1952

2,595,329

UNITED STATES PATENT OFFICE 2,595,329

VEHICLE SEAT GUARD

James L. Brooks, Blytheville, Ark.

Application March 26, 1949, Serial No. 83,623

6 Claims. (Cl. 5—94)

This invention relates to certain new and useful improvements in guard attachments adapted particularly for use in conjunction with a vehicle seat, and more particularly with the rear seat of two-seated vehicles.

Heretofore there have been attempts to provide attachments for guard use in connection with automobiles and other vehicles, but in the main these attachments have required permanent alterations in the structure of the vehicle and more or less permanent installations to accommodate the attachment. Other types have further failed to provide a positive guard of appropriate arrangement to accomplish the purposes accomplished by the present invention.

The principal object of the invention is to provide a guard attachment for a vehicle seat which may be readily attached regardless of the size or make of the vehicle and which requires no permanent or semi-permanent fixture in or alteration to the vehicle structure.

A further object of the invention is to provide a guard attachment for a vehicle seat which may be quickly and positively positioned and fixed in position and which may as quickly be removed as desired.

A further object of the invention is to provide a guard attachment for a vehicle seat which may be interchangeably used in various vehicles without special additional equipment.

A further object of the invention is to provide such a guard attachment which may be adjusted to desired use length and which may be collapsed to a fraction of its maximum length for storage purposes.

A further object of the invention is to provide such a guard attachment with means for preventing undesired collapse of the attachment when in use.

A further object of the invention is to provide such a guard attachment with means for removably engaging the vehicle seat means.

And a further object of the invention is to generally improve the design, utility and efficiency of guard attachments for vehicle seats.

The means by which the foregoing and other objects of the present invention are accomplished and the manner of their accomplishment will readily be understood from the following specification upon reference to the accompanying drawings, in which:

Fig. 4 is a detailed view on a further enlarged scale of a variation in the hook means for engaging the seat means of the vehicle.

Fig. 5 is a front view of a modification of the invention.

Fig. 6 is a fragmentary sectional view on an enlarged scale taken on the line VI—VI of Fig. 5.

Fig. 7 is a fragmentary end view of the variation, as illustrated in Fig. 5, illustrating a modification in the wall engaging means.

Fig. 8 is a fragmentary front view of an end portion of the variation as illustrated in Fig. 5.

Fig. 9 is a fragmentary end view of the modification of Fig. 7 applied to the guard attachment illustrated in Fig. 1; and Fig. 10 is a view similar to Fig. 8 illustrating a further modification in the means for engaging the vehicle wall means.

Figure 1:
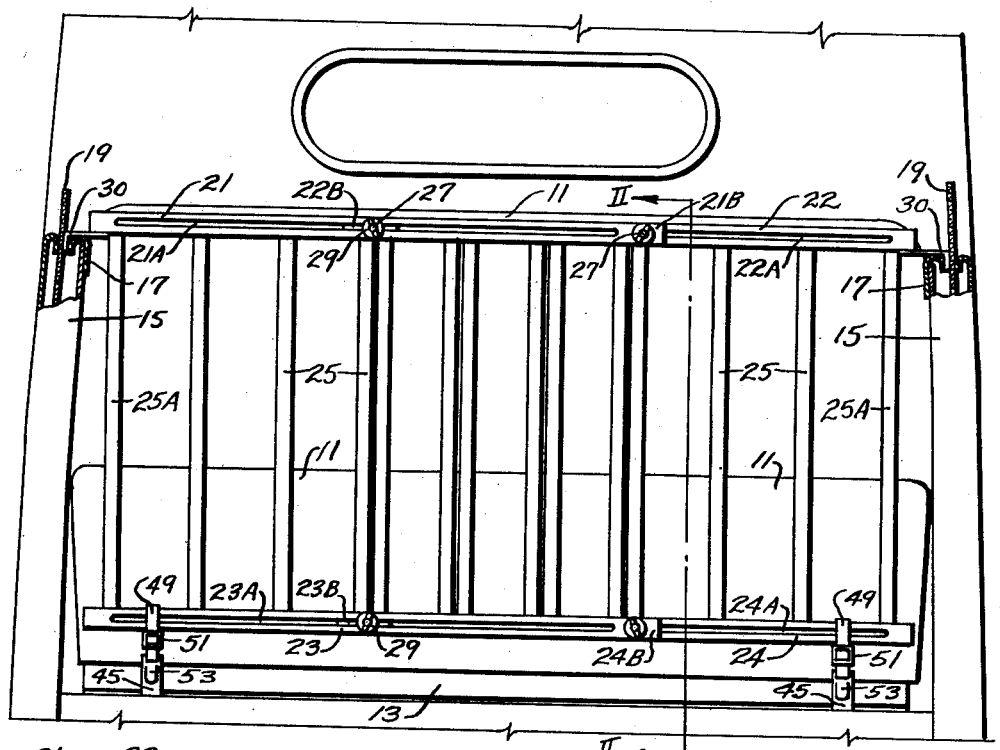
Fig. 1 is a front view of the guard attachment of this invention in adjusted use length and positioned within the rear compartment of a vehicle.
Figure 2:
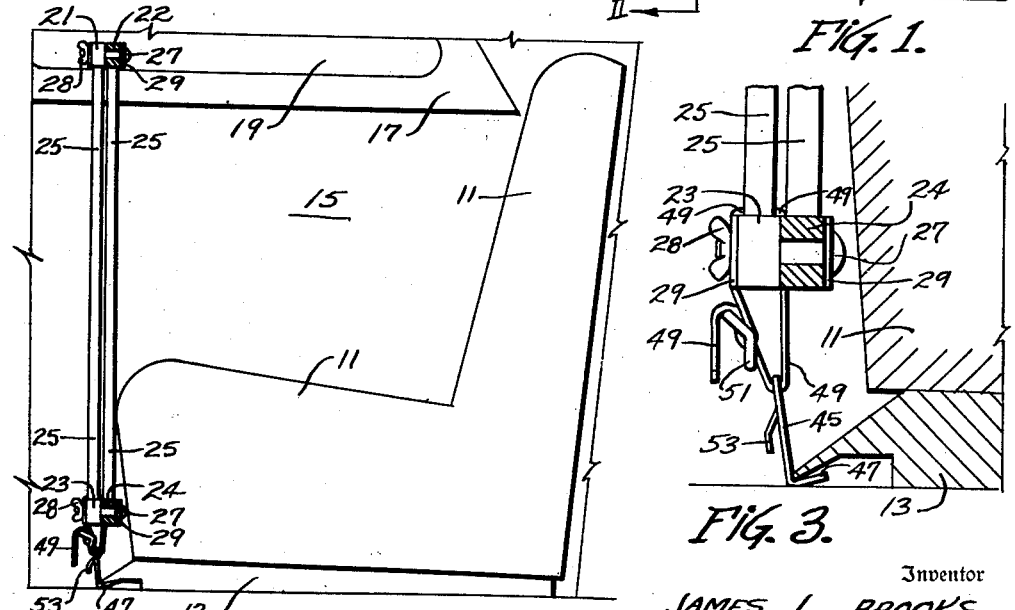
Fig. 2 is a sectional view taken on the line II—II of Fig. 1.
Figure 3:
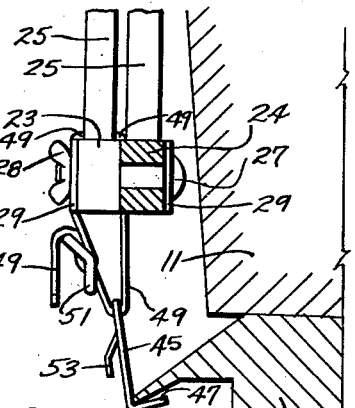
Fig. 3 is a fragmentary sectional view on an enlarged scale of the lower portion of the guard attachment, as shown in Fig. 2.

Referring now to the drawings in which the various parts are illustrated by numerals; the device is illustrated in Fig. 1 in use position in the rear compartment of a vehicle which includes seat means comprising a seat cushion 11 and a seat support 13, the seat means being disposed in usual fashion transverse the vehicle, and side means at the sides of the vehicle, the side wall means including wall portions 15, window sills 17, and windows 19.

The guard attachment consists of a pair of panels, which include upper rails 21, 22, lower rails 23, 24, which rails are horizontally disposed, and barrier means, consisting in the present illustration of vertically disposed uprights or bars 25, which extend between the upper and lower rails and in the form illustrated are respectively rigidly secured to the rails. Each panel is preferably of a length somewhat in excess of half of the usual width of the vehicle interior.

The upper rails 21, 22, include major slotted portions 21A, 22A, the slots preferably extending substantially throughout the length of the rails, and minor end portions 21B, 22B, which extend beyond one end of the related slots. The end portions 21B, 22B are each provided with a suitable aperture extending horizontally therethrough and adapted to receive a bolt 27, each of the bolts 27 being provided with a suitable nut as the wing nut 28, and, if desired, having washers 29 associated therewith. It will be noted that the end portions 21B, 22B are relatively very minor in length and that the slotted portions 21A, 22A extend substantially throughout the entire length of the upper rails 21, 22. The slots in each of the slotted portions thus extends from a point adjacent though segregated from the apertures in the end portions to a point adjacent the opposite ends of the rails. Similarly the lower rails 23, 24 are provided with end portions 23B, 24B which are apertured to receive additional bolts 27, and the lower rails have major slotted portions 23A, 24A substantially identical with the slotted portions 21A, 22A.

Each of the panels adjacent the upper rails and remote from the apertured end portions is provided with means for engaging the wall means of the vehicle, each engaging means projecting outwardly beyond the extremities of the rails. In the form illustrated in Fig. 1, each of the panels has rigidly attached at the under side of the upper rails 21, 22 a substantially L-shaped bracket member 30 which has a downwardly projecting leg 31, the bracket being adapted to overlie a portion of the wall means, as the window sills 17 or the upper edges of the windows 19 as desired, with the leg 31 extending downwardly to engagement, to prevent inward movement of the bracket member. The brackets 30 are rigidly secured to the upper rails 21, 22 adjacent the end bars 25A. In some instances it is desirable to provide for vertical adjustment of the wall engaging means, which, as illustrated in Fig. 9, may call for the employment of a modified upper bracket 130 which comprises a substantially U-shaped member having at its outer end a downwardly projecting leg 131, similar to the leg 31 previously described, and having at its inner end a downwardly projecting leg 133 which is suitably apertured to receive bolts 135 which are provided with suitable nuts 137. In the use of the modified bracket 129 the end bars 25A are preferably provided with a plurality of vertically spaced apertures 139 which are adapted to receive the bolts 135 and by which the brackets 130 may be secured in adjusted position to the end bars 25A.

The guard attachment includes at its lower end means for detachably engaging the vehicle seat means, which, as illustrated, includes a hook member 45 which is illustrated in its preferred form as substantially L-shaped with the leg 47 of the L preferably arranged at an angle less than ninety degrees to the main portion of the hook and being illustrated as engaged beneath the forward edge of the support 13 which forms part of the vehicle seat means. Preferably each panel of the guard attachment is provided with a lower hook 45, attachment of the hooks to the panels being accomplished by flexible and adjustable straps 49, including suitable buckles 51.

It is also preferred that each of the hooks be provided with a tab 53 projecting oppositely from the leg 47, the tabs 53 being provided as a ready means of grasping the hooks 45 when removal of the guard attachment is desired. As illustrated in Fig. 4, the hooks 45 may be swivelly attached to the straps 49 with a suitable swivel 55 being interposed between the straps and the hooks.

In the modification of the invention as illustrated in Figs. 5, 6 and 7, it will be seen that the arrangement of the invention as shown in Fig. 1 is modified in two primary respects.

It will be seen that the upper rails of the panels in Fig. 5 consist of tube-like members 121, 122 and that the lower rails similarly consist of tube-like members 123, 124. These rails are horizontally disposed and each panel includes barrier means, in the present illustration consisting of vertically disposed tube-like bars 125. As illustrated, the upper rail 122 and lower rail 124 are respectively designed to telescopically engage with the upper rail 121 and lower rail 123. The second modification illustrated in Fig. 5 consists in providing but one of the upper rails and but one of the lower rails with a slotted portion, as the slotted portions 121A, 123A, and in providing the opposite rails 122, 124 with apertured end portions 122B, 124B, the apertures of these end portions being adapted to receive bolts 27, having nuts 28 with which convex washers 129 may be used.

It will be understood that, while the arrangement of Fig. 5 shows, and has been described with one upper rail and one lower rail having a slotted portion and with the opposite upper rail and lower rail being apertured, both of the upper rails and both of the lower rails may include slotted portions and apertured end portions in the manner illustrated in Fig. 1 and heretofore described. It will also be noted that in Fig. 5 the wall engaging means are shown as consisting of brackets 130, already described, for which the brackets 30 may be readily substituted.

As in the case of the guard attachment illustrated in Fig. 1, the modified arrangement includes substantially identical means for detachably engaging the vehicle seat means, including hook members 45, and flexible and adjustable straps 49, and, if desired, these seat engaging means may include swivels 55 as previously described.

In Fig. 10 a further modification of the means for engaging the vehicle wall means is illustrated, consisting of a further modified bracket 230 which is provided at its outer end with a suction cup 231 which is adapted to engage against an upright portion of the wall means, such as the interior faces of the windows 19, and to thereby effect attachment of the bracket to the wall means. As indicated in Fig. 10, the bracket 230 may be secured to the end bars 25A in the manner of attachment of the bracket 130 thereto, the bracket being illustrated as including an inner leg 233 similar to the inner leg 133. It will also be understood that the bracket 230 may be attached to the respective panels of the guard attachment in the manner of the attachment of the brackets 30, as illustrated in Fig. 1.

With the respective panels provided with the enumerated parts the guard attachment is fabricated therefrom by assembling the panels with their inner end portions opposite to the bracket bearing outer end portions disposed in lapped relation with the respective upper and lower rails of the panels in sliding engagement. It will be seen that in the arrangement as illustrated in Fig. 1, the upper rails 21, 22 and the lower rails 23, 24 are respectively disposed with adjacent faces in sliding contact, and the respective end portions 21B, 22B, 23B, 24B are positioned to bring the apertures in such end portions into register with a segment of the respective elongated slots carried by the adjacent rails. Thus the aperture of end portion 21B is in register with a portion of the slot of the slotted portion 22A, and similarly the apertured end portion 24B is in register with a portion of the slot of slotted portion 23A. With the members thus disposed the bolts 27 are passed through the registering apertures and slot segments and the nuts 28 threadedly engaged therewith.

It will thus be seen that a slidably adjustable guard attachment is provided with full flexibility of adjustment throughout the lengths of the slots carried by the respective rails. It will further be seen that each of the bolts 27 remains in fixed position relatively to the aperture in which it is carried so as to constantly insure spaced points of attachment between the respective panels, resulting in a central double panel consisting of the overlapped panel sections with two point upper fastening and two point inner fastening, and insuring against jackknifing or undesired collapse of the guard.

In the form illustrated in Fig. 5, the panels are brought into lapped relation with the upper rails and the lower rails telescopically engaged, so that the aperture of the portion 122B registers with a portion in the slot of the slotted portion 121A and similarly the aperture of portion 124B registers with a portion of the slot of the portion 123A. The bolts 27 may then be inserted through the registering apertures and slot segments and the nuts 28 applied thereto.

When the major body of the guard attachment has been assembled the desired form of bracket 30, 130, or 230 may be selected and attached to the respective panels adjacent to the ends and with the wall engaging portions projecting outwardly beyond the ends of the upper rails. If the type of attachment indicated with the bracket 30 is employed, the brackets may be secured to the under side of the upper rails 21, 22, or 121, 122, to project the wall engaging means outwardly beyond the ends of the respective upper rails and adjacent thereto. If it is desired to employ the vertically adjustable wall engaging means, the type of attachment illustrated in conjunction with the bracket 130 may then be employed, in which case the end bars 25A, or 125A are provided with suitable apertures 139 vertically spaced along the respective bars. A bracket 130, or a bracket 230, as desired, may be attached in preferred vertical position through the medium of bolts 135 and nuts 137 so as to position the wall engaging means adjacent the upper rails and projecting outwardly therebeyond.

In the use of the device, the assembled guard attachment may be introduced into the rear compartment in the vehicle to which it is applied. If the brackets 30 have been employed, the respective wall engaging legs 31 are inserted into engagement with the opposite window sills 17, or if desired, with the upper edge portions of the windows 19. The sliding adjustability of the panels disposed in lapped relation permits the outward movement of the panels to provide the necessary length to span between the opposite portions of the wall means engaged by the bracket members. When this length has been established and the brackets engaged with the wall means, the nuts 28 may be tightened on the bolts 27, effecting concurrent clamping engagement of the lapped portions of the panels, including both upper and lower rails so as to maintain them in the established use length.

The hooks 45 may then be brought into engagement below the seat means of the vehicle, which engagement may, as illustrated, be with the seat support 13, or in other vehicle arrangements may be with the under side of the seat cushion 11. When the hooks have been thus positioned the flexible straps 49 may be tightened in the buckles 51 to bring the hooks into positive engagement with the under side of the seat means, thus preventing upward movement of the positioned guard attachment and further to retain the brackets in engagement with the portions of the wall means.

It is found that in many instances it is extremely convenient to include the swivels 55 in the seat engaging assembly, thus permitting reversal of the hook in the event of the initial positioning of the guard attachment in the vehicle in reversed position. As is apparent, the swivel attachment of the hook provides a great convenience and a facility in the use of the guard attachment. It is further found that by extending the leg 47 from the hook 45 at an angle somewhat less than ninety degrees a more positive engagement of the under side of the seat means by the hook is provided, and it is accordingly considered desirable to establish the hook 45 at an angle in the nature of but slightly less than ninety degrees.

It will be noted that if the brackets 230 are employed the cups 231 are brought into engagement with portions of the wall means, preferably the inner surface of the windows 19, and are held there engaged by suction, the panels being moved outwardly to bring the cups into such wall engagement and being then clamped in adjusted use length, as previously described.

When the removal of the guard attachment is desired the straps 49 are loosened in their buckles 51, releasing the tension on the hooks 45, and the hooks may then be disengaged from the under side of the seat means. In this connection it will be seen that the tabs 53 afford a convenient means for handling the hooks 45 to effect such removal. When the hooks have been disengaged from the seat means the wall engaging means may be disengaged. The nuts 28 may be loosened on the bolts 27 and permit the collapse of the device into a fraction of its use length. The length of the slots in the slotted portions 21A, 22A, 23A, 24A, which, as previously described, extend substantially throughout the length of the respective rails permit the sliding movement of the bolts 27 carried by the apertured end portions substantially throughout the length of the rails so that the entire structure may be collapsed for storage purposes to a length equal approximately to the length of one of the panels. It will be noted that the outer ends of the slots in the slotted portions 21A, 22A, 23A, 24A, preferably extend to a point which is spaced from the outer ends of the respective rails 21, 22, 23, 24, a distance substantially equal to the spacing of the apertures in the apertured end portions 21B, 22B, 23B, 24B, from the opposite or inner ends of the respective rails.

It thus will be seen that in the present invention there is provided an extremely useful and novel guard attachment for a vehicle which is readily adjustable to permit use in vehicles having compartments of varying sizes, which provides means for positively engaging the vehicle wall means to prevent inward or downward movement of the guard attachment, and means for engaging the vehicle seat means which are readily adjustable to accommodate the seat means with which the guard is to be used, and which prevent upward movement of the guard.

It will further be seen that this guard attachment may thus be readily employed in vehicles of various sizes and that it requires no permanent alteration in the vehicle by the installation of any permanent or semi-permanent fixtures, nor does it require any disfigurement of the vehicle, such as drill holes or the like.

I claim:

1. A guard attachment for use in a vehicle having seat means and wall means at the outer ends of the seat means, which attachment comprises a pair of panels, each including a top rail, a bottom rail, and a plurality of vertically disposed, horizontally spaced bars rigidly secured to and extending between said top and bottom rails; a downwardly facing bracket member secured to each said panel to lie adjacent and laterally project beyond one end of each said top rail; said panels being disposed with the opposite ends of said rails in lapping relation and slidably adjustable to establish the use length of said guard attachment; each said rail including an elongated slot extending substantially throughout the length of the rail and a minor end portion extending beyond one end of said slot, and having an aperture formed therethrough segregated from said slot, each said aperture being in register with a portion of the slot of the adjacent rail when said rails are in said lapping relation; clamp means concurrently engaging said registered apertures and slot portions to maintain said use length; an adjustable strap fastened to and depending below said bottom rail, a swivel attached to said strap, hook means rotatably secured to said swivel and rearwardly faced for engaging said seat means; said bracket members being removably engageable with said wall means and said hook means removably engaging said seat means when said guard is in use position to detachably connect said guard to said vehicle, said hook means including a tab forwardly projecting therefrom to provide means for effecting release of said hook means from engagement with said seat means.

2. A guard attachment for use in a vehicle having seat means and wall means at the ends of the seat means, which attachment comprises a pair of panels, each including a top rail, a bottom rail, and a plurality of vertically disposed, horizontally spaced bars rigidly secured to and extending between said top and bottom rails; a downwardly facing bracket member secured to each said panel to lie adjacent and laterally project beyond one end of each said top rail; said panels being disposed with the opposite ends of said rails in lapping relation and slidably adjustable to establish the use length of said guard attachment; clamp means concurrently engaging said lapped rails to maintain said use length; an adjustable strap fastened to and depending below said bottom rails, a swivel attached to said strap, hook means rotatably secured to said swivel and being rearwardly faced for engaging said seat means, said bracket members being removably engageable with said wall means and said hook means being removably engageable with said seat means when said guard is in use position to detachably connect said guard to said vehicle, said hook means including a tab forwardly projecting therefrom to provide means for effecting release of said hook means from engagement with said seat means.

3. A guard attachment for use in a vehicle having seat means and wall means at the end of the seat means, which attachment comprises a pair of panels, each including a top rail, a bottom rail, and barrier means secured to and extending between said top and bottom rails; downwardly facing bracket members for removably engaging said wall means, attached to and laterally projecting from one end of each said panel adjacent said top rails; said panels being disposed with the opposite end portions of said panels in lapped relation and being slidably adjustable to establish the use length of said guard attachment; clamp means concurrently engaging said lapped portions to maintain said use length; an adjustable strap fastened to said guard and depending below said bottom rails, a swivel attached to said strap, hook means rotatably secured to said swivel and rearwardly faced for engaging said seat means, said hook means being removably engageable with said seat means when said guard is in use position, said hook means including a tab forwardly projecting therefrom to provide means for effecting release of said hook means from engagement with said seat means.

4. A guard attachment for use in a vehicle having seat means and wall means at the end of the seat means, which attachment comprises a pair of panels, each including a top rail, a bottom rail, and barrier means secured to and extending between said top and bottom rails; downwardly facing bracket means adjustably attached to and laterally projecting from one end of each said panel adjacent said top rails; said panels being disposed with the opposite end portions of said panels in lapping relation and being slidably adjustable to establish the use length of said guard attachment; clamp means concurrently engaging said lapped portions to maintain said use length; each said panel including a flexible strap secured to and depending below the bottom rail of its panel, means for adjusting the length of said strap means, and a hook attached to said strap, said hook having a leg angularly disposed relative to the main body of said hook at an angle of less than ninety degrees and a tab projecting from said main body oppositely to said leg.

5. A guard attachment for use in a vehicle having seat means and wall means at the end of the seat means, which attachment comprises a pair of panels, each including a top rail, a bottom rail, and barrier means secured to and extending between said top and bottom rails; downwardly facing bracket means attached to and laterally projecting from one end of each said panel adjacent said top rails; said panels being disposed with the opposite end portions of said panels in lapping relation and being slidably adjustable to establish the use length of said guard attachment; clamp means concurrently engaging said lapped portions to maintain said use length; each said panel including a flexible strap secured to and depending below the bottom rail of its panel, means for adjusting the length of said strap means, and a hook attached to said strap, said hook having a tab projecting forwardly from the main body of the hook.

6. A guard attachment for use in a vehicle having seat means and wall means at the end of the seat means, which attachment comprises top and bottom rails, and barrier means secured to and extending between said top and bottom rails; downwardly facing bracket means secured to said guard adjacent to and laterally projecting beyond said top rails, flexible strap means secured to said guard and depending below said bottom rails, means for adjusting the length of said strap means, rotatable swivel means carried by said strap means, and hook means rotatably attached to said swivel means, said hook means including a leg projecting rearwardly from the main body of said hook means at an angle relative to said body of less than ninety degrees.

JAMES L. BROOKS.

REFERENCES CITED

The following references are of record in the file of this patent:

UNITED STATES PATENTS

| Number | Name | Date |
|---|---|---|
| 141,677 | Tuttle | Aug. 12, 1895 |
| 855,159 | Brown | May 28, 1907 |
| 1,211,320 | Knapp | Jan. 2, 1917 |
| 1,263,097 | Moormeister | Apr. 16, 1918 |
| 1,943,763 | Melaas | Jan. 16, 1934 |
| 1,959,974 | Westgate | May 22, 1934 |
| 2,048,955 | Showalter | July 28, 1936 |
| 2,308,315 | Smith | Jan. 12, 1943 |
| 2,369,552 | Ferran | Feb. 13, 1945 |
| 2,532,007 | Biaselle | Nov. 28, 1950 |